US010489969B2

(12) United States Patent
Buckton et al.

(10) Patent No.: US 10,489,969 B2
(45) Date of Patent: Nov. 26, 2019

(54) METHOD AND SYSTEM FOR PRESENTING SHADED DESCRIPTORS CORRESPONDING WITH SHADED ULTRASOUND IMAGES

(71) Applicant: General Electric Company, Schenectady, NY (US)

(72) Inventors: Daniel John Buckton, Zipf (AT); Gerald Schroecker, Zipf (AT)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 8 days.

(21) Appl. No.: 15/806,503

(22) Filed: Nov. 8, 2017

(65) Prior Publication Data
US 2019/0139299 A1    May 9, 2019

(51) Int. Cl.
| | | |
|---|---|---|
| *G06T 15/83* | (2011.01) | |
| *G06T 11/00* | (2006.01) | |
| *G06T 7/507* | (2017.01) | |
| *G06T 7/514* | (2017.01) | |
| *G06T 7/529* | (2017.01) | |
| *G06T 15/80* | (2011.01) | |

(52) U.S. Cl.
CPC .............. *G06T 15/83* (2013.01); *G06T 7/507* (2017.01); *G06T 7/514* (2017.01); *G06T 7/529* (2017.01); *G06T 11/001* (2013.01); *G06T 15/80* (2013.01); *G06T 2207/10024* (2013.01); *G06T 2207/10132* (2013.01); *G06T 2210/41* (2013.01); *G06T 2215/12* (2013.01)

(58) Field of Classification Search
None
See application file for complete search history.

(56) References Cited

U.S. PATENT DOCUMENTS

| | | |
|---|---|---|
| 5,860,931 A | 1/1999 | Chandler et al. |
| 9,483,821 B2 | 11/2016 | Oh et al. |
| 2007/0014446 A1 | 1/2007 | Sumanaweera et al. |
| 2009/0028406 A1 | 1/2009 | Arditi et al. |

(Continued)

OTHER PUBLICATIONS

"Volusion: Your Foundation for extraordinary vision in women's health ultrasound imaging," GE Website, Available Online at http://www3.gehealthcare.com/en/products/categories/ultrasound/voluson, Available as early as Apr. 15, 2015, as Retrieved on Jul. 6, 2017, 2 pages.

(Continued)

*Primary Examiner* — Ryan M Gray
(74) *Attorney, Agent, or Firm* — McAndrews, Held & Malloy, Ltd.; Jacob Groethe; David Bates

(57) ABSTRACT

A method and system for applying shading to descriptors that are presented with 2D ultrasound images having corresponding shading is provided. The method may include mapping, by a processor, height values of a synthetic map to pixels of a descriptor. The method may include determining, by the processor, a gradient of the height values for each of the pixels of the descriptor. The method may include applying, by the processor, shading to the descriptor based on shading parameters and the gradient of the height values for each of the pixels of the descriptor to create a shaded descriptor. The method may include presenting, by the processor, the shaded descriptor at a display system with a 2D ultrasound image having shading corresponding with the shading applied to the shaded descriptor.

20 Claims, 5 Drawing Sheets

(56) References Cited

U.S. PATENT DOCUMENTS

| | | | |
|---|---|---|---|
| 2010/0290686 A1 | 11/2010 | Canstein et al. | |
| 2012/0265074 A1 | 10/2012 | Na et al. | |
| 2013/0169641 A1 | 7/2013 | Schroecker | |
| 2014/0044325 A1* | 2/2014 | Ma | G06T 19/00 |
| | | | 382/128 |
| 2014/0049542 A1* | 2/2014 | Engel | G06T 15/506 |
| | | | 345/426 |
| 2015/0209012 A1* | 7/2015 | Oh | A61B 8/465 |
| | | | 600/438 |
| 2015/0213597 A1* | 7/2015 | Oh | G01S 7/52063 |
| | | | 382/131 |
| 2016/0350962 A1 | 12/2016 | Steen | |
| 2017/0027648 A1* | 2/2017 | Hart | G06T 19/20 |
| 2017/0086785 A1 | 3/2017 | Bjaerum | |
| 2017/0090571 A1 | 3/2017 | Bjaerum et al. | |
| 2017/0188995 A1 | 7/2017 | Bruestle et al. | |
| 2017/0238904 A1 | 8/2017 | Perrey et al. | |
| 2018/0082487 A1 | 3/2018 | Kiraly et al. | |
| 2018/0322628 A1* | 11/2018 | Schroecker | G06T 7/0012 |

OTHER PUBLICATIONS

"Blinn-Phong shading model," Wikipedia Website, Available Online at https://en.wikipedia.org/wiki/Blinn%E2%80%93Phong_shading_model, Last modified Nov. 10, 2016, as Retrieved on Apr. 10, 2017, 5 pages.

"Phong Reflection model," Wikipedia Website, Available Online at https://en.wikipedia.orgiwiki/Phong_reflection_model, Last modified Feb. 21, 2017, as Retrieved on Apr. 10, 2017, 5 pages.

"Specular highlight," Wikipedia Website, Available Online at https://en.wikipedia.org/wiki/Specular_highlight, Last modified Feb. 27, 2017, as Retrieved on Apr. 10, 2017, 5 pages.

"Heightmap," Wikipedia Website, Available Online at https://en.wikipedia.org/wiki/Heightmap, Last modified Mar. 5, 2017, as Retrieved on Apr. 10, 2017, 3 pages.

"Heightmap," Unity Documentation Website, Available Online at https://docs.unity3d.com/Manual/StandardShaderMaterialParameterHeightMap.html, Jun. 19, 2017, 3 pages.

* cited by examiner

METHOD AND SYSTEM FOR PRESENTING SHADED DESCRIPTORS CORRESPONDING WITH SHADED ULTRASOUND IMAGES

FIELD

Certain embodiments relate to ultrasound imaging. More specifically, certain embodiments relate to a method and system for presenting shaded descriptors, such as color displaymap descriptors and icon descriptors, which correspond with displayed two-dimensional (2D) ultrasound images having shading.

BACKGROUND

An ultrasound imaging system may be used to acquire images of a patient's anatomy. Ultrasound imaging systems may acquire a dataset which is then used to generate a 2D image that a medical professional may view and use to diagnose a patient. However, the dataset may include 2D scalar data (e.g., intensity values, power component values, or the like) which results in a flat 2D image that may be more difficult to interpret, thereby increasing a difficulty of diagnosing a patient using the flat 2D image. For example, more complex body structures may be difficult to recognize via a 2D image. As one example, 2D color Doppler images of different body structures may be especially difficult to use for diagnosis.

Recent developments in ultrasound imaging have provided shading to 2D ultrasound images to present a three-dimensional (3D) effect thereby enhancing visualization of the 2D images. However, a user viewing the 2D ultrasound images at a display system may have difficulty determining a level of shading being applied and/or whether the shading feature is active.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method is provided for applying shading to descriptors that are presented with 2D ultrasound images having corresponding shading, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
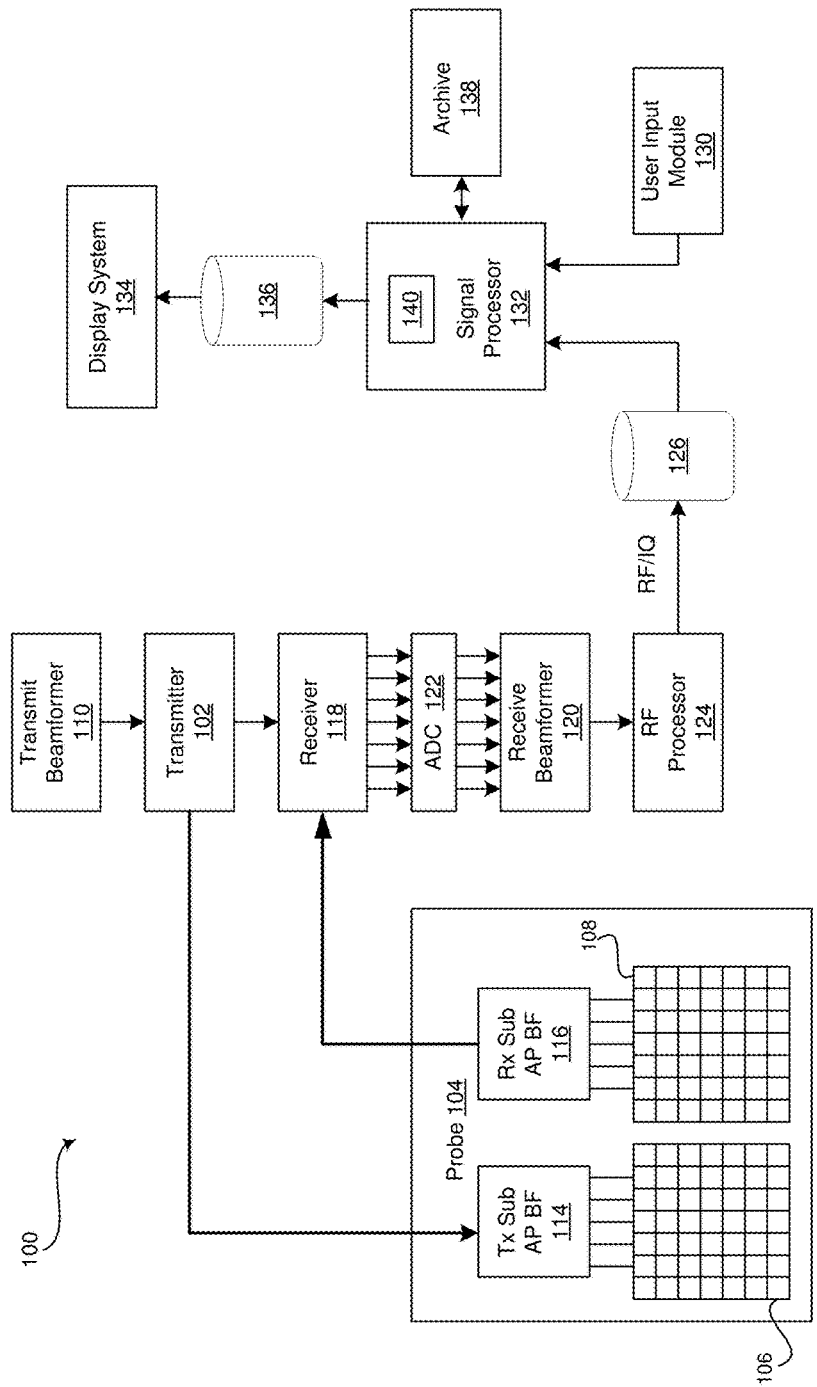
FIG. 1 is a block diagram of an exemplary ultrasound system that is operable to provide shaded descriptors for presentation with shaded 2D ultrasound images, in accordance with various embodiments.

Certain embodiments may be found in a method and system for applying shading to descriptors that are presented with 2D ultrasound images having corresponding shading. For example, various aspects have the technical effect of providing visual feedback with shaded color displaymap descriptors and/or icon descriptors that indicate the level of shading provided to 2D ultrasound images and/or whether the shading feature is active.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present disclosure. The following detailed description is, therefore, not to be taken in a limiting sense, and the scope of the present disclosure is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Also as used herein, the term "image" broadly refers to both viewable images and data representing a viewable image. However, many embodiments generate (or are configured to generate) at least one viewable image. In addition, as used herein, the phrase "image" is used to refer to an ultrasound mode such as B-mode, CF-mode and/or sub-modes of CF such as TVI, Angio, B-flow, BMI, BMI_Angio, and in some cases also MM, CM, PW, TVD, CW where the "image" and/or "plane" includes a single beam or multiple beams.

Furthermore, the term processor or processing unit, as used herein, refers to any type of processing unit that can carry out the required calculations needed for the disclosure, such as single or multi-core: CPU, Graphics Board, DSP, FPGA, ASIC or a combination thereof.

It should be noted that various embodiments described herein that generate or form images may include processing for forming images that in some embodiments includes beamforming and in other embodiments does not include beamforming. For example, an image can be formed without beamforming, such as by multiplying the matrix of demodulated data by a matrix of coefficients so that the product is the image, and wherein the process does not form any "beams". Also, forming of images may be performed using channel combinations that may originate from more than one transmit event (e.g., synthetic aperture techniques).

In various embodiments, ultrasound processing to form images is performed, for example, including ultrasound beamforming, such as receive beamforming, in software, firmware, hardware, or a combination thereof. One implementation of an ultrasound system having a software beamformer architecture formed in accordance with various embodiments is illustrated in FIG. 1.

FIG. 1 is a block diagram of an exemplary ultrasound system 100 that is operable to provide shaded descriptors 400, 500 for presentation with shaded 2D ultrasound images 700, in accordance with various embodiments. Referring to FIG. 1, there is shown an ultrasound system 100. The ultrasound system 100 comprises a transmitter 102, an ultrasound probe 104, a transmit beamformer 110, a receiver 118, a receive beamformer 120, a RF processor 124, a RF/IQ buffer 126, a user input module 130, a signal processor 132, an image buffer 136, an archive 138, and a display system 134.

The transmitter 102 may comprise suitable logic, circuitry, interfaces and/or code that may be operable to drive an ultrasound probe 104. The ultrasound probe 104 may comprise a two dimensional (2D) array of piezoelectric elements. The ultrasound probe 104 may comprise a group of transmit transducer elements 106 and a group of receive transducer elements 108, that normally constitute the same elements.

The transmit beamformer 110 may comprise suitable logic, circuitry, interfaces and/or code that may be operable to control the transmitter 102 which, through a transmit sub-aperture beamformer 114, drives the group of transmit transducer elements 106 to emit ultrasonic transmit signals into a region of interest (e.g., human, animal, underground cavity, physical structure and the like). The transmitted ultrasonic signals may be back-scattered from structures in the object of interest, like blood cells or tissue, to produce echoes. The echoes are received by the receive transducer elements 108.

The group of receive transducer elements 108 in the ultrasound probe 104 may be operable to convert the received echoes into analog signals, undergo sub-aperture beamforming by a receive sub-aperture beamformer 116 and are then communicated to a receiver 118. The receiver 118 may comprise suitable logic, circuitry, interfaces and/or code that may be operable to receive and demodulate the signals from the receive sub-aperture beamformer 116. The demodulated analog signals may be communicated to one or more of the plurality of analog-to-digital (A/D) converters 122.

The plurality of A/D converters 122 may comprise suitable logic, circuitry, interfaces and/or code that may be operable to convert the demodulated analog signals from the receiver 118 to corresponding digital signals. The plurality of A/D converters 122 are disposed between the receiver 118 and the receive beamformer 120. Notwithstanding, the disclosure is not limited in this regard. Accordingly, in some embodiments, the plurality of A/D converters 122 may be integrated within the receiver 118.

The receive beamformer 120 may comprise suitable logic, circuitry, interfaces and/or code that may be operable to perform digital beamforming processing to, for example, sum the delayed channel signals received from the plurality of A/D converters 122 and output a beam summed signal. The resulting processed information may be converted back to corresponding RF signals. The corresponding output RF signals that are output from the receive beamformer 120 may be communicated to the RF processor 124. In accordance with some embodiments, the receiver 118, the plurality of A/D converters 122, and the beamformer 120 may be integrated into a single beamformer, which may be digital.

The RF processor 124 may comprise suitable logic, circuitry, interfaces and/or code that may be operable to demodulate the RF signals. In accordance with an embodiment, the RF processor 124 may comprise a complex demodulator (not shown) that is operable to demodulate the RF signals to form I/Q data pairs that are representative of the corresponding echo signals. The RF or I/Q signal data may then be communicated to an RF/IQ buffer 126. The RF/IQ buffer 126 may comprise suitable logic, circuitry, interfaces and/or code that may be operable to provide temporary storage of the RF or I/Q signal data, which is generated by the RF processor 124.

The user input module 130 may be utilized to input patient data, surgical instrument data, scan parameters, settings, configuration parameters, change scan mode, select a colormap, select a shading level, and the like. For example, the user input module 130 may be operable to receive a selection of a colormap for color Doppler imaging and/or a shading level for application to the color Doppler imaging data. In an exemplary embodiment, the user input module 130 may be operable to configure, manage and/or control operation of one or more components and/or modules in the ultrasound system 100. In this regard, the user input module 130 may be operable to configure, manage and/or control operation of transmitter 102, the ultrasound probe 104, the transmit beamformer 110, the receiver 118, the receive beamformer 120, the RF processor 124, the RF/IQ buffer 126, the user input module 130, the signal processor 132, the image buffer 136, the archive 138, and/or the display system 134.

The signal processor 132 may comprise suitable logic, circuitry, interfaces and/or code that may be operable to process ultrasound scan data (i.e., RF signal data or IQ data pairs) for generating cross-plane 2D ultrasound image for presentation on a display system 134. In various embodiments, the cross-plane image data for processing by the signal processor 132 may be acquired simultaneously or consecutively with one ultrasound probe 104. The signal processor 132 is operable to perform one or more processing operations according to a plurality of selectable ultrasound modalities on the acquired ultrasound scan data. In an exemplary embodiment, the signal processor 132 may be operable to perform compounding, motion tracking, and/or speckle tracking. Acquired ultrasound scan data may be processed in real-time during a scanning session as the echo signals are received. Additionally or alternatively, the ultrasound scan data may be stored temporarily in the RF/IQ buffer 126 during a scanning session and processed in less than real-time in a live or off-line operation.

The ultrasound system 100 may be operable to continuously acquire ultrasound scan data at a frame rate that is suitable for the imaging situation in question. Typical frame rates range from 20-70 but may be lower or higher. The acquired ultrasound scan data may be displayed on the display system 134 at a display-rate that can be the same as the frame rate, or slower or faster. An image buffer 136 is included for storing processed frames of acquired ultrasound scan data that are not scheduled to be displayed immediately. Preferably, the image buffer 136 is of sufficient capacity to store at least several seconds' worth of frames of ultrasound scan data. The frames of ultrasound scan data are stored in a manner to facilitate retrieval thereof according to its order or time of acquisition. The image buffer 136 may be embodied as any known data storage medium.

The signal processor 132 may include a descriptor shading module 140 that comprises suitable logic, circuitry, interfaces and/or code that may be operable to apply shading 410, 520-540 to descriptor(s) 400, 500 for presentation at the display system 134 with 2D ultrasound images 700 having corresponding shading 710. The descriptor shading module 140 may apply shading to descriptors 400, 500 based on a selected or default colormap, a selected or default shading level, and a synthetic height map 300. For example, the descriptor shading module 140 may retrieve from archive 138 or any suitable data storage medium a color displaymap descriptor 200 and/or icon descriptor in response to a colormap selection via user input module 130 or a default colormap.

The descriptor shading module 140 may be configured to apply a height map 300 and shading model to the retrieved color displaymap descriptor 200 and/or icon descriptor. The shading model may be a diffuse specular shading model, a Phong reflection model, a Blinn-Phong shading model, a specular highlight shading model, or any suitable shading model. In various embodiments, the shading model may be configured based at least in part on a default shading level or a shading level selected via the user input module 130. For example, the shading levels may include a plurality of no shading, low shading, mid shading, high shading, or any suitable shading levels. In an exemplary embodiment, each of the shading levels may have an associated set of shading parameters to provide the desired shading level. The shading parameters may include a specular intensity, diffuse intensity, and/or any suitable shading parameters.

In a representative embodiment, the selected or default colormap and/or shading level may be applied by the signal processor 132 to provide the 2D ultrasound images 700 having corresponding shading 710. In other words, the shading 710 provided to the 2D ultrasound images 700 by the signal processor 132 may be based on the same selected or default colormap and/or shading level employed by the descriptor shading module 140 to apply shading 410, 520-540 to the descriptor(s) 400, 500. Accordingly, the color displaymap descriptor 400 and/or icon descriptor 500 presented at the display system 134 with the 2D ultrasound images 700 may provide visual information regarding the level of shading 710 in the 2D ultrasound image 700 and/or whether the 2D ultrasound image 700 includes shading 710.

In certain embodiments, the signal processor 132 may apply shading 710 to the 2D ultrasound image 700 based at least in part on converting scalar image values such as an intensity value for B-mode images or a power value for Doppler images to a height value using a relationship (e.g., model). In an exemplary embodiment, the retrieved color displaymap descriptor 200 and/or icon descriptor may include a plurality of pixels each having a color value corresponding with the selected or default colormap. For example, the pixels may be displayed on a grid having an x-axis (horizontal) and a y-axis (vertical), where each pixel comprises one x unit along the x-axis and one y unit along the y-axis. Thus, each pixel has an x and y value defining its position on the grid defining the retrieved color displaymap descriptor 200 and/or icon descriptor. In contrast to the 2D ultrasound image 700, the pixels of the color displaymap descriptor 200 and/or icon descriptor may not include image values for conversion to height values. Accordingly, aspects of the present disclosure include a synthetic height map 300 that include pre-defined height values corresponding to each of the pixels of the retrieved color displaymap descriptor 200 and/or icon descriptor. The descriptor shading module 140 may be configured to map each of the pre-defined height values (h(x,y), h(x+1, y), etc.) of the synthetic height map 300 to the corresponding pixel of the retrieved color displaymap descriptor 200 and/or icon descriptor. The descriptor shading module 140 may comprise suitable logic, circuitry, interfaces and/or code that may be operable to compute the gradient, including a surface normal for each height value, h(x,y), at each pixel.

An example equation for computing the gradient, including a surface normal, is shown by the following:

$$\vec{n}(x, y) = |\nabla h(x, y)| = \left\| \begin{pmatrix} \frac{\partial h}{\partial x} \\ \frac{\partial h}{\partial y} \\ r \end{pmatrix} \right\| = \left\| \begin{pmatrix} h(x-1, y) - h(x+1, y) \\ h(x, y-1) - h(x, y+1) \\ r \end{pmatrix} \right\|$$

In the above equation, n(x,y) is the surface normal vector at pixel position (x,y) with unit length, $\nabla$ is the gradient, h(x,y) is the scalar height value from synthetic height map 300 at position (x,y), and r is a constant defining the roughness of the resulting gradient field. The normal of the height value h(x,y) at the position (x,y) is computed by computing the norm of the gradient at this position. The gradient is defined by the partial derivatives in the direction of x and y. The x component is computed with central differences in the x direction. The y component is computed with central differences in the y direction. The z component is the constant r. In this way, determining a gradient for each height value h(x,y) is based on a difference in height values of adjacent pixels in the retrieved color displaymap descriptor 200 and/or icon descriptor (e.g., h(x−1,y), h(x+1,y), h(x,y−1), and h(x,y+1)).

In computing the norm (length=1) of the gradient, the influences of the roughness constant varies for different gradient lengths. For example, if the position (x,y) is in a homogenous region (e.g., a region of the image with little or no variation between height values of adjacent pixels), the x,y components of the gradient are smaller and r is the dominating factor, thereby resulting in a normal vector pointing approximately in the z direction n=(0,0,1). In another example, if the position (x,y) is in a greatly varying area (e.g., a region of the image with larger variation between height values of adjacent pixels), the x and/or the y component of the gradient is bigger and r has less influence, thereby resulting in the normal pointing slightly upwards in the direction of the change. As one example, computing the gradient of the retrieved color displaymap descriptor 200 and/or icon descriptor includes computing the surface normal of the height field consisting of the height values.

In various embodiments, the descriptor shading module 140 may be configured to apply shading (e.g., surface shading) to the retrieved color displaymap descriptor 200 and/or icon descriptor using the surface normal vector, n(x,y), at each pixel position (x,y) of the retrieved color displaymap descriptor 200 and/or icon descriptor after computing the gradient of each height value, h(x,y). After the application of surface shading using the gradient, the resulting color displaymap descriptor 400 and/or icon descriptor 500 includes shading 410, 520-540 at each color pixel. In various embodiments, shading is not applied to the grayscale portion 220, 420 of the color displaymap descriptor 200, 400 corresponding with the non-shaded background grayscale B-mode image data of the 2D ultrasound image 700. The shading model applied by the descriptor shading module 140 may be one or more shading models, such as a diffuse specular shading model, a Phong reflection model, a Blinn-Phong shading model, a specular highlight shading model, or the like that may be modified based on a default or selected one of a plurality of shading levels each having an associated set of shading parameters such as a specular intensity, diffuse intensity, and/or any suitable shading parameters.

In certain embodiments, the descriptor shading module 140 may be configured to select one of a predetermined color displaymap descriptor 400 and/or icon descriptor 500 based on the default or selected colormap and shading level instead of dynamically shading the color displaymap descriptor 200 and/or icon descriptor as described above. For example, a set of predetermined color displaymap descriptors 400 may be stored in archive 138 or any suitable data storage medium. As an example, if there are 8 available colormaps and 4 available shading levels, a set of 32 predetermined color displaymap descriptors 400 may be stored for retrieval by the descriptor shading module 140 in response to the default or selected colormap and shading level. In various embodiments, dynamic shading may be preferable to enable changes to the synthetic height maps and shading models and algorithms without having to generate new sets of predetermined color displaymap descriptors 400 and/or icon descriptors 500.

Figure 2:
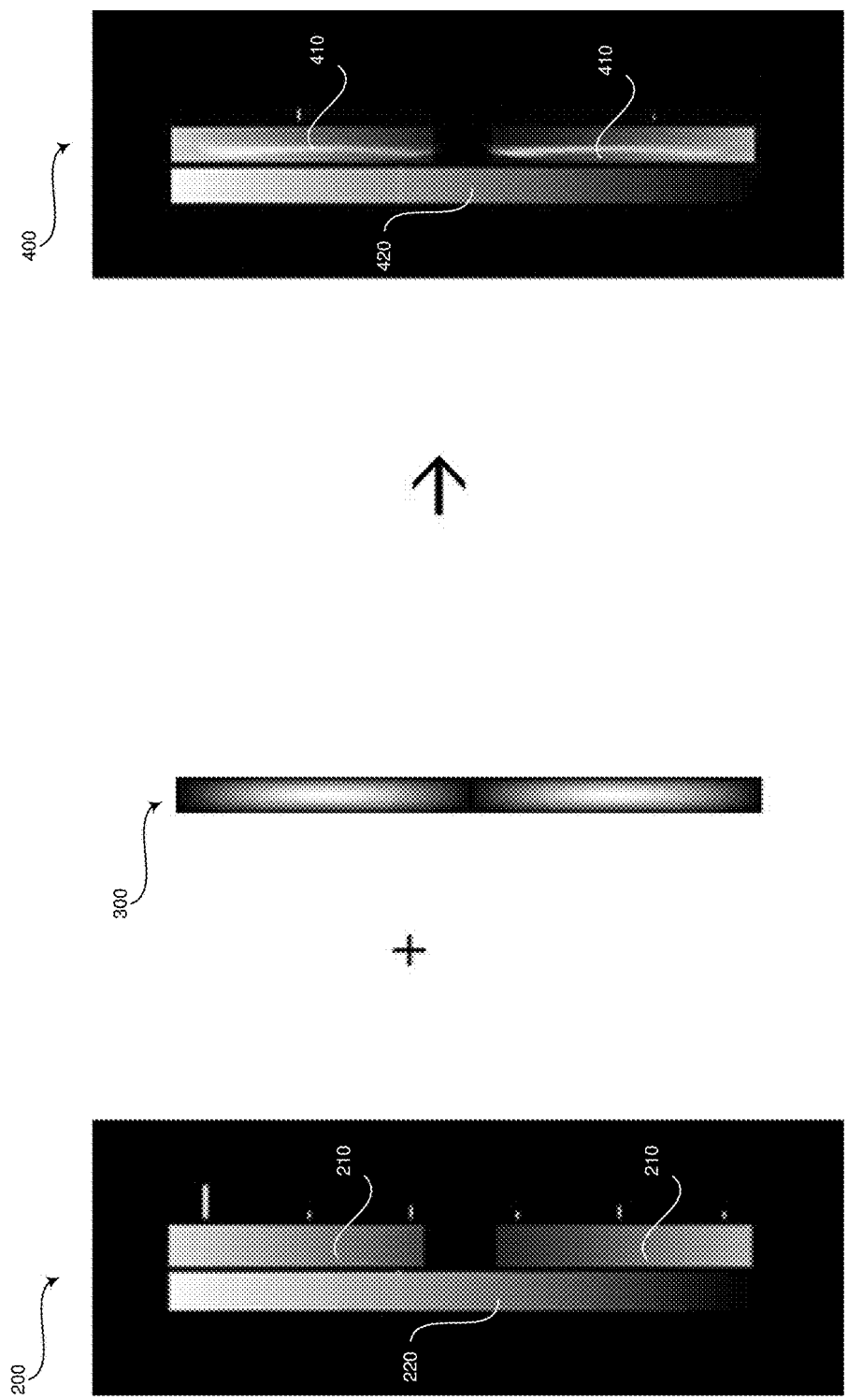
FIG. 2 illustrates an exemplary shaded color displaymap descriptor generated from a color displaymap descriptor and a synthetic height map, in accordance with various embodiments.

FIG. 2 illustrates an exemplary shaded 410 color displaymap descriptor 400 generated from a color displaymap descriptor 200 and a synthetic height map 300, in accordance with various embodiments. Referring to FIG. 2, a color displaymap descriptor 200 may include non-shaded grayscale 220 and color 210 portions. The color displaymap descriptor 200 may be presented with a non-shaded 2D ultrasound image 700 at display system 134 if the shading functionality is not enabled. The descriptor shading module 140 may generate a color displaymap descriptor 400 having shading 410 applied to the color portion of the descriptor 400 if the shading functionality is activated. In various embodiments, shading is not applied to the grayscale portion 420 of the color displaymap descriptor 400, which may correspond, for example, with non-shaded background grayscale B-mode image data of the 2D ultrasound image 700. The descriptor shading module 140 may generate a color displaymap descriptor 400 having shading 410 by mapping height values of a synthetic height map 300 to corresponding pixels of the color portion 210 of the color displaymap descriptor 200. The descriptor shading module 140 may compute the gradient, including a surface normal, of each height value at each pixel of the color portion 210. The descriptor shading module 140 may be configured to apply shading to the retrieved color displaymap descriptor 200 using the surface normal at each pixel position of the color displaymap descriptor 200, resulting in the color displaymap descriptor 400 having shading 410 at each color pixel. The shading model applied by the descriptor shading module 140 may be based at least in part on a default or selected shading level having one or more shading parameters such as a specular intensity, diffuse intensity, and/or any suitable shading parameters.

Figure 3:
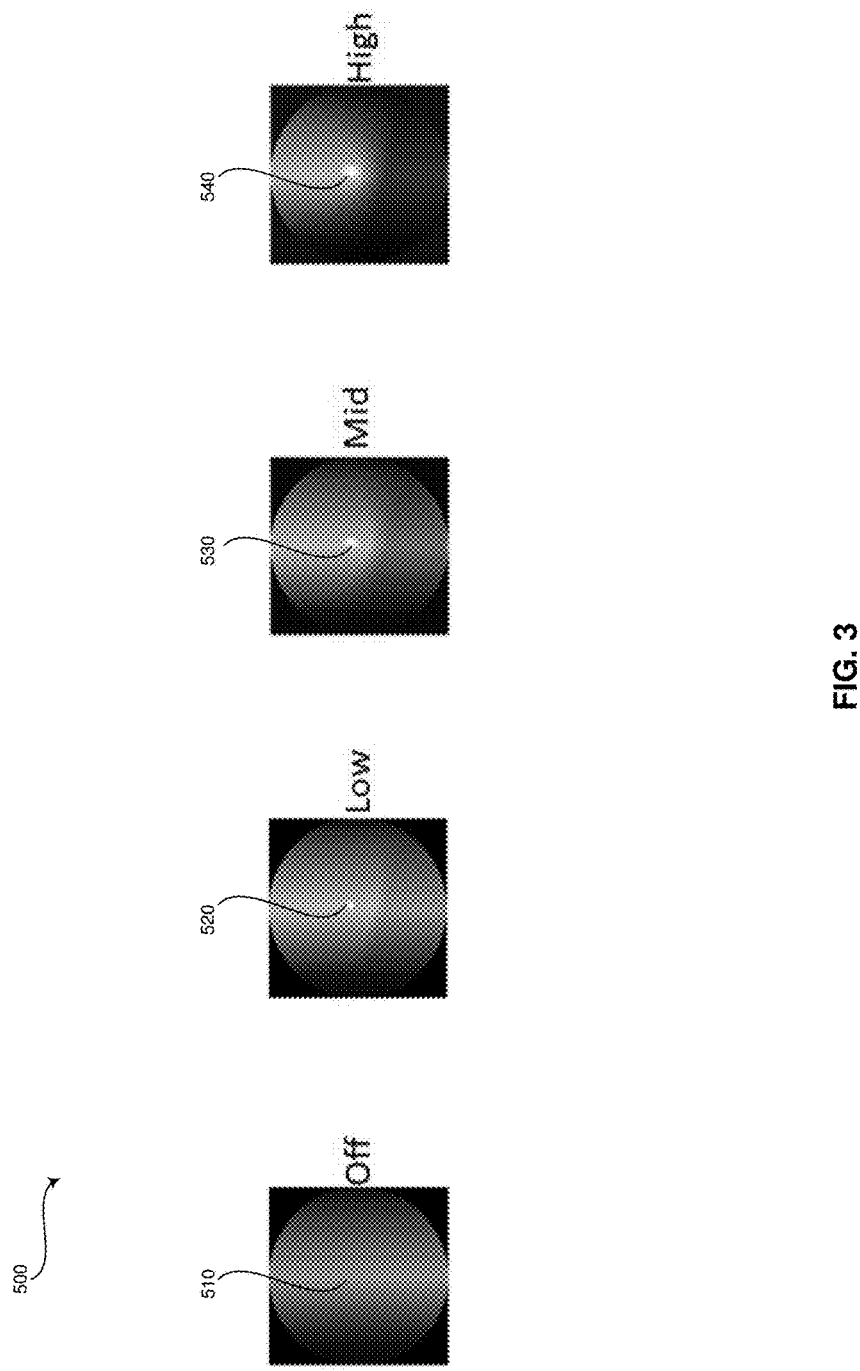
FIG. 3 illustrates exemplary color icon descriptors corresponding with different shading levels, in accordance with various embodiments.

FIG. 3 illustrates exemplary color icon descriptors 500 corresponding with different shading levels 510-540, in accordance with various embodiments. Referring to FIG. 3, color icon descriptors 500 may include one of a plurality of shading levels 510-540. The color icon descriptor 500 having no shading 510 may be presented with a non-shaded 2D ultrasound image 700 at display system 134 if the shading functionality is not enabled. The descriptor shading module 140 may generate a color icon descriptor 500 having low shading 520, mid shading 530, high shading 540, or any suitable shading for presentation with a correspondingly-shaded 710 2D ultrasound image 700 at display system 134 if the shading functionality is activated. The descriptor shading module 140 may generate a color icon descriptor 500 having shading 520-540 by mapping height values of a similarly-shaped synthetic height map to corresponding pixels of the color icon descriptor 500. The descriptor shading module 140 may compute the gradient, including a surface normal, of each height value at each pixel of the color icon descriptor 500. The descriptor shading module 140 may be configured to apply shading to the retrieved color icon descriptor using the surface normal at each pixel position of the color icon descriptor, resulting in the color icon descriptor 500 having shading 520-540 at each color pixel. The shading model applied by the descriptor shading module 140 may be based at least in part on a default or selected shading level having one or more shading parameters such as a specular intensity, diffuse intensity, and/or any suitable shading parameters. Although FIG. 3 illustrates a sphere-shaped color icon descriptor 500, any suitably-shaped color icon descriptor 500 is contemplated.

Figure 4:
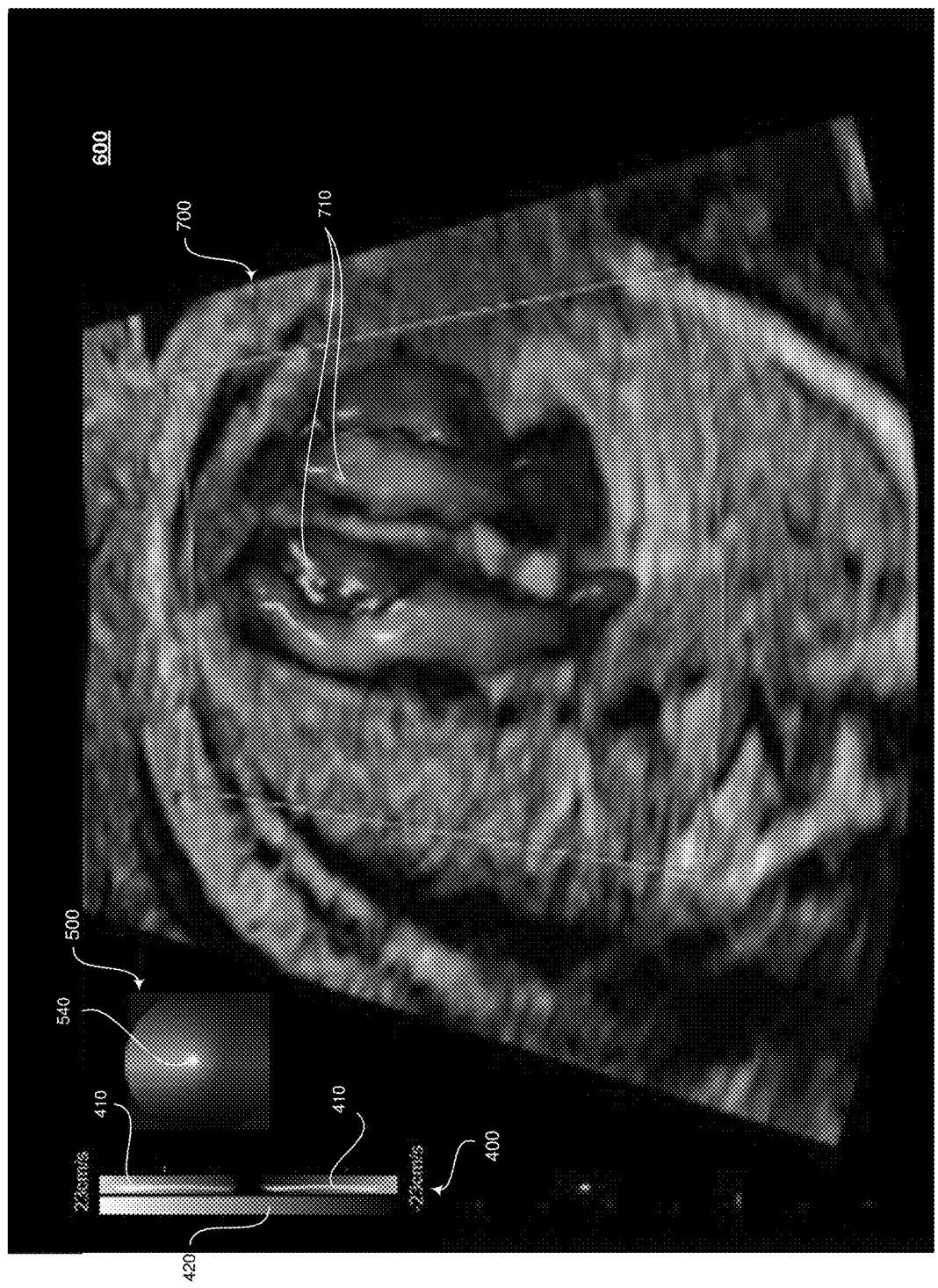
FIG. 4 illustrates an exemplary screenshot having shaded descriptors presented with a shaded 2D ultrasound image, in accordance with various embodiments.

FIG. 4 illustrates an exemplary screenshot 600 having shaded descriptors 400, 500 presented with a shaded 710 2D ultrasound image 700, in accordance with various embodiments. Referring to FIG. 4, a screenshot 600 may be presented at a display system 134 of an ultrasound system 100. The screenshot 600 may include a 2D ultrasound image 700 and one or more descriptors 400, 500. The descriptors 400, 500 may include a color displaymap descriptor 400, a color icon descriptor 500, or any suitable descriptor 500. The descriptors 400, 500 may illustrate a default or selected colormap used for the 2D ultrasound image 700. The descriptors 400, 500 may include shading 410, 540 corresponding with a shading level used to provide shading 710 to the 2D ultrasound image 700. The descriptors 400, 500 may illustrate no shading if a shading feature is not enabled. Accordingly, the descriptors 400, 500 provide visual feedback regarding whether the shading feature is active and a selected or default level of shading 710 applied to the 2D ultrasound image 700. For example, a user may select an orange and blue colormap and a high level of shading for application to 2D ultrasound images. The 2D ultrasound images 700 may be shaded 710 according to the user instruction and be presented with one or more of the color displaymap descriptor 400 and the color icon descriptor 500 having the same selected orange and blue colormap and high level of shading 410, 540 to provide visual feedback regarding the implementation of the selected colormap and shading level.

Figure 5:
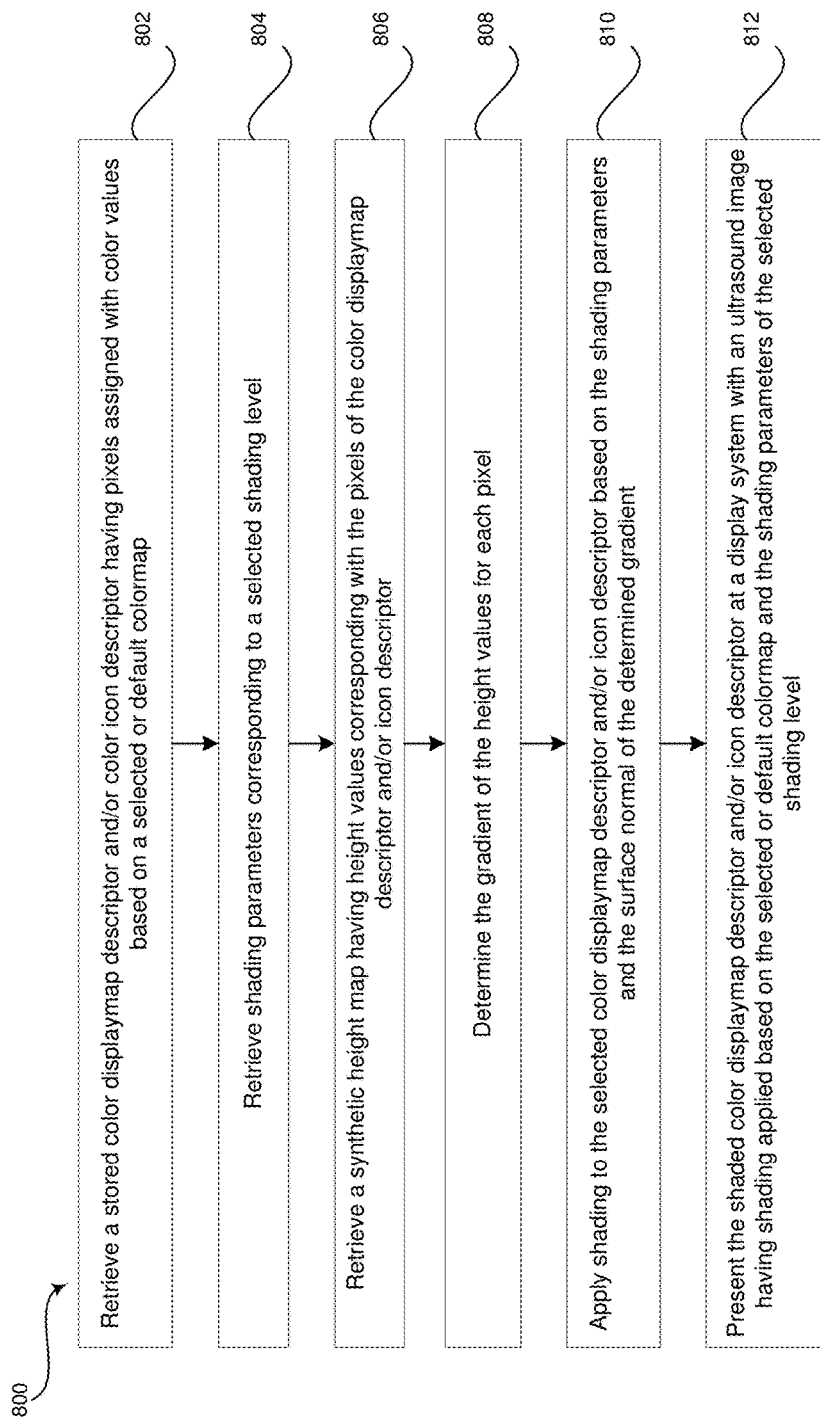
FIG. 5 is a flow chart illustrating exemplary steps that may be utilized for applying shading to descriptors that are presented with 2D ultrasound images having corresponding shading, in accordance with various embodiments.

FIG. 5 is a flow chart illustrating exemplary steps 802-812 that may be utilized for applying shading to descriptors that are presented with 2D ultrasound images having corresponding shading, in accordance with various embodiments. Referring to FIG. 5, there is shown a flow chart 800 comprising exemplary steps 802 through 812. Certain embodiments may omit one or more of the steps, and/or perform the steps in a different order than the order listed, and/or combine certain of the steps discussed below. For example, some steps may not be performed in certain embodiments. As a further example, certain steps may be performed in a different temporal order, including simultaneously, than listed below.

At step 802, a signal processor 132 of an ultrasound system 100 may retrieve a stored color displaymap descriptor 200 and/or icon descriptor having pixels assigned with color values based on a selected or default colormap. For example, a user may provide a colormap selection via user input module 130. A descriptor shading module 140 of the signal processor 132 may retrieve from archive 138 or any suitable data storage medium a color displaymap descriptor 200 and/or icon descriptor associated with the selected colormap, or if no colormap was selected, a default colormap. The retrieved color displaymap descriptor 200 and/or icon descriptor may include pixels having color values corresponding with the selected or default colormap.

At step 804, the signal processor 132 may retrieve shading parameters corresponding to a selected shading level. For example, a user may provide a shading level selection, such as no shading, low shading, mid shading, high shading, or any suitable shading level selection. Each of the shading levels may be associated with one or more shading parameters. The shading parameters may include, for example, specular intensity, diffuse intensity, or any suitable shading parameter. The shading parameters associated with the selected or default shading level may be retrieved by the descriptor shading module 140 from archive 138 or any suitable data storage medium.

At step 806, the signal processor 132 may retrieve a synthetic height map having height values corresponding with the pixels of the color displaymap descriptor 200 and/or icon descriptor. For example, the descriptor shading module 140 may retrieve the synthetic height map(s) 300 from archive 138 or any suitable data storage medium. The synthetic height map(s) 300 may have a shape generally corresponding to the shape of the color displaymap descriptor 200 and/or the icon descriptor. The synthetic height map(s) 300 may have a number of height values generally corresponding to the number of pixels of the color displaymap descriptor 200 and/or the icon descriptor. The height values of the synthetic height map(s) 300 may be mapped to the pixels of the color displaymap descriptor 200 and/or the icon descriptor.

At step 808, the signal processor 132 may determine the gradient of the height values for each pixel. For example, the descriptor shading module 140 may calculate the gradient including a surface normal of each of the height values mapped to each of the pixels of the color displaymap descriptor 200 and/or icon descriptor. In one embodiment, the descriptor shading module 140 may calculate the gradient of a pixel using the height value of that pixel and the adjacent pixels. Specifically, the gradient for each pixel may be determined according to a relationship or gradient equation stored in a memory of the signal processor 132 of the imaging system 100 that takes into account the height value of the chosen pixel and the height values of the nearest (e.g., left and right) neighbors of the chosen pixel. Calculating the gradient includes calculating a normal of the surface of the pixel. In this way, a gradient surface normal may be determined for each pixel of the color displaymap descriptor 200 and/or icon descriptor.

At step 810, the signal processor 132 may apply shading to the retrieved color displaymap descriptor 200 and/or icon descriptor based on the shading parameters and the surface normal of the determined gradient. For example, the descriptor shading module 140 may calculate shading values for the pixels of the displaymap descriptor 200 and/or icon descriptor based on the gradient surface normal on a shading model modified based on the shading parameters of the selected or default shading level. The descriptor shading module 140 may make a logical determination of the shading value for each pixel based on the shading model stored in processor memory, archive 138, or any suitable data storage medium that is a function of the gradient surface normal. The descriptor shading module 140 may then apply the determined shading value to the pixel to form a color displaymap descriptor and/or icon descriptor having shading 410, 520-540. As explained above, the shading model used to apply shading 410, 520-540 to the descriptor(s) 400, 500 may be one or more shading models, such as a diffuse specular shading model, a Phong reflection model, a Blinn-Phong shading model, a specular highlight shading model, or the like modified based on the shading parameters such as specular intensity, diffuse intensity, and/or any suitable shading parameters. In alternate embodiments, the shading model may be a more complex global model which simulates light propagation with shadowing, and the like.

At step 812, the signal processor 132 may present the shaded 410, 520-540 color displaymap descriptor 400 and/or icon descriptor 500 at a display system 134 with an ultrasound image 700 having shading 710 applied based on the selected or default colormap and the shading parameters of the selected shading level. In various embodiments, the displayed descriptor(s) 400, 500 provides visual feedback regarding the employed colormap, whether the shading feature is active, and the level of shading 710 applied to the 2D ultrasound image 700.

Aspects of the present disclosure provide a method 800 for applying shading 410, 520-540 to descriptors 400, 500 that are presented with 2D ultrasound images 700 having corresponding shading 710. In accordance with various embodiments, the method 800 may include mapping 806, by a processor 132, 140, height values of a synthetic map 300 to pixels of a descriptor 400, 500. The method 800 may include determining 808, by the processor 132, 140, a gradient of the height values for each of the pixels of the descriptor 400, 500. The method 800 may include applying 810, by the processor 132, 140, shading 410, 520-540 to the descriptor 400, 500 based on shading parameters and the gradient of the height values for each of the pixels of the descriptor 200 to create a shaded descriptor 400, 500. The method 800 may comprise presenting 812, by the processor 132, 140, the shaded descriptor 400, 500 at a display system 134 with a 2D ultrasound image 700 having shading 710 corresponding with the shading 410, 520-540 applied to the shaded descriptor 400, 500.

In a representative embodiment, a shape of the synthetic map 300 corresponds with a shape of the descriptor 200, 400, 500. In certain embodiments, the descriptor 200, 400, 500 has a number of pixels corresponding to a number of the height values of the synthetic map 300. In an exemplary embodiment, the descriptor 200, 400, 500 is one or both of a color displaymap descriptor 200, 400 and a color icon descriptor 500. In various embodiments, the method 800 may comprise retrieving 802 the descriptor 200, 400, 500 from memory 138 based on a selected or default colormap from a plurality of colormaps. The pixels of the descriptor 200, 400, 500 may be color pixels corresponding with the selected or default colormap. In a representative embodiment, the method 800 may comprise retrieving 804 the shading parameters from memory 138 based on a selected or default shading level of a plurality of shading levels. In certain embodiments, the shading parameters correspond with a shading level selected from a plurality of shading levels. The shading parameters may comprise one or both of a specular intensity and a diffuse intensity.

In an exemplary embodiment, applying shading 410, 520-550 to the descriptor 400, 500 using the determined gradient includes applying shading 410, 520-550 to the descriptor 400, 500 based on a shading model which is a function of surface normals of the determined gradient, the shading model including one or more of a diffuse specular shading model, a Phong reflection model, a Blinn-Phong shading model, and a specular highlight shading model. The shading model may be modified based on the shading parameters. In various embodiments, determining the gradient of the height values includes determining a separate gradient for each height value of the height values. The separate gradient for each height value may be based on a difference between height values of adjacent pixels of the descriptor 200, 400, 500. In a representative embodiment, each separate gradient for each height value is used to compute a surface normal. The applying shading 410, 520-540 to the descriptor 400, 500 may include applying shading 410, 520-540 to the descriptor 400, 500 using the shading parameters and the surface normal of each of the pixels of the descriptor 400, 500.

Various embodiments provide a system 100 for applying shading 410, 520-540 to descriptors 400, 500 that are presented with 2D ultrasound images 700 having corresponding shading 710. The system 100 comprises a processor 132, 140 configured to map height values of a synthetic map 300 to pixels of a descriptor 200, 400, 500. The processor 132, 140 may be configured to determine a gradient of the height values for each of the pixels of the descriptor 200, 400, 500. The processor 132, 140 may be configured to apply shading 410, 520-540 to the descriptor 200 based on shading parameters and the gradient of the height values for each of the pixels of the descriptor 200 to create a shaded descriptor 400, 500. The system 100 comprises a display system 134 configured to present the shaded 410, 520-540 descriptor 400, 500 with a 2D ultrasound image 700 having shading 710 corresponding with the shading 410, 520-540 applied to the shaded descriptor 400, 500.

In certain embodiments, the descriptor 200, 400, 500 is one or both of a color displaymap descriptor 200, 400 and a color icon descriptor 500. In an exemplary embodiment, the processor 132, 140 is configured to retrieve the descriptor 200, 400, 500 from memory 138 based on a selected or default colormap from a plurality of colormaps. The pixels of the descriptor 200, 400, 500 may be color pixels corresponding with the selected or default colormap. The processor 132, 140 may be configured to retrieve the shading parameters from memory 138 based on a selected or default shading level of a plurality of shading levels. In various embodiments, the shading parameters correspond with a shading level selected from a plurality of shading levels. The shading parameters may comprise one or both of a specular intensity and a diffuse intensity.

In a representative embodiment, the processor 132, 140 is configured to apply shading 410, 520-540 to the descriptor 200, 400, 500 based on a shading model which is a function of surface normals of the determined gradient. The shading model may include one or more of a diffuse specular shading model, a Phong reflection model, a Blinn-Phong shading model, and a specular highlight shading model. The shading model may be modified based on the shading parameters. In certain embodiments, the processor 132, 140 is configured to determine a separate gradient for each height value of the height values to determine the gradient of the height values for each of the pixels of the descriptor 200, 400, 500. The separate gradient for each height value may be based on a difference between height values of adjacent pixels of the descriptor 200, 400, 500. In an exemplary embodiment, each separate gradient for each height value is used by the processor 132, 140 to compute a surface normal. The processor 132, 140 may be configured to apply shading 410, 520-540 to the descriptor 200, 400, 500 using the shading parameters and the surface normal of each of the pixels of the descriptor 200, 400, 500.

Certain embodiments provide a non-transitory computer readable medium having stored thereon, a computer program having at least one code section. The at least one code section is executable by a machine for causing the machine to perform steps. The steps 800 include. The steps 800 include mapping 806 height values of a synthetic map 300 to pixels of a descriptor 200, 400, 500. The steps 800 include determining 808 a gradient of the height values for each of the pixels of the descriptor 200, 400, 500. The steps 800 include applying 810 shading 410, 520-540 to the descriptor 200 based on shading parameters and the gradient of the height values for each of the pixels of the descriptor 200 to create a shaded descriptor 400, 500. The steps 800 include presenting 812 the shaded descriptor 400, 500 at a display system 134 with a 2D ultrasound image 700 having shading 710 corresponding with the shading 410, 520-540 applied to the shaded descriptor 400, 500.

In various embodiments, the steps 800 include retrieving 802 the descriptor 200, 400, 500 from memory 138 based on a selected or default colormap from a plurality of colormaps. The pixels of the descriptor 200, 400, 500 are color pixels corresponding with the selected or default colormap. The steps 800 may include retrieving the shading parameters from memory 138 based on a selected or default shading level of a plurality of shading levels. In a representative embodiment, the shading parameters correspond with a shading level selected from a plurality of shading levels. The shading parameters may comprise one or both of a specular intensity and a diffuse intensity. In certain embodiments, the determining the gradient of the height values includes determining a separate gradient for each height value of the height values. The separate gradient for each height value may be based on a difference between height values of adjacent pixels of the descriptor 200, 400, 500. In an exemplary embodiment, each separate gradient for each height value is used to compute a surface normal. The applying shading 410, 520-540 to the descriptor 200, 400, 500 includes applying shading 410, 520-540 to the descriptor 200, 400, 500 using the shading parameters and the surface normal of each of the pixels of the descriptor 200, 400, 500.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for applying shading to descriptors that are presented with 2D ultrasound images having corresponding shading.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited.

The present disclosure may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method comprising:
   mapping, by a processor, height values of a synthetic map to pixels of a descriptor;
   determining, by the processor, a gradient of the height values for each of the pixels of the descriptor;
   applying, by the processor, shading to the descriptor based on shading parameters and the gradient of the height values for each of the pixels of the descriptor to create a shaded descriptor; and
   presenting, by the processor, the shaded descriptor at a display system with a 2D ultrasound image having shading corresponding with the shading applied to the shaded descriptor.

2. The method according to claim 1, wherein one or both of:
   a shape of the synthetic map corresponds with a shape of the descriptor, and
   the descriptor has a number of pixels corresponding to a number of the height values of the synthetic map.

3. The method according to claim 1, wherein the descriptor is one or both of a color displaymap descriptor and a color icon descriptor.

4. The method according to claim 1, comprising one or both of:
   retrieving the descriptor from memory based on a selected or default colormap from a plurality of colormaps, wherein the pixels of the descriptor are color pixels corresponding with the selected or default colormap, and
   retrieving the shading parameters from memory based on a selected or default shading level of a plurality of shading levels.

5. The method according to claim 1, wherein the shading parameters correspond with a shading level selected from a plurality of shading levels, the shading parameters comprising one or both of a specular intensity and a diffuse intensity.

6. The method according to claim 1, wherein applying shading to the descriptor using the determined gradient includes applying shading to the descriptor based on a shading model which is a function of surface normals of the determined gradient, the shading model including one or more of a diffuse specular shading model, a Phong reflection model, a Blinn-Phong shading model, and a specular highlight shading model, and wherein the shading model is modified based on the shading parameters.

7. The method according to claim 1, wherein determining the gradient of the height values includes determining a separate gradient for each height value of the height values, and wherein the separate gradient for each height value is based on a difference between height values of adjacent pixels of the descriptor.

8. The method according to claim 7, wherein each separate gradient for each height value is used to compute a surface normal, and wherein applying shading to the descriptor includes applying shading to the descriptor using the shading parameters and the surface normal of each of the pixels of the descriptor.

9. A system comprising:
   a processor configured to:
      map height values of a synthetic map to pixels of a descriptor,
      determine a gradient of the height values for each of the pixels of the descriptor, and
      apply shading to the descriptor based on shading parameters and the gradient of the height values for each of the pixels of the descriptor to create a shaded descriptor; and
   a display system configured to present the shaded descriptor with a 2D ultrasound image having shading corresponding with the shading applied to the shaded descriptor.

10. The system according to claim 9, wherein the descriptor is one or both of a color displaymap descriptor and a color icon descriptor.

11. The system according to claim 9, wherein the processor is configured to one or both of:
retrieve the descriptor from memory based on a selected or default colormap from a plurality of colormaps, wherein the pixels of the descriptor are color pixels corresponding with the selected or default colormap, and
retrieve the shading parameters from memory based on a selected or default shading level of a plurality of shading levels.

12. The system according to claim 9, wherein the shading parameters correspond with a shading level selected from a plurality of shading levels, the shading parameters comprising one or both of a specular intensity and a diffuse intensity.

13. The system according to claim 9, wherein the processor is configured to apply shading to the descriptor based on a shading model which is a function of surface normals of the determined gradient, the shading model including one or more of a diffuse specular shading model, a Phong reflection model, a Blinn-Phong shading model, and a specular highlight shading model, and wherein the shading model is modified based on the shading parameters.

14. The system according to claim 9, wherein the processor is configured to determine a separate gradient for each height value of the height values to determine the gradient of the height values for each of the pixels of the descriptor, and wherein the separate gradient for each height value is based on a difference between height values of adjacent pixels of the descriptor.

15. The system according to claim 14, wherein each separate gradient for each height value is used by the processor to compute a surface normal, and wherein the processor is configured to apply shading to the descriptor using the shading parameters and the surface normal of each of the pixels of the descriptor.

16. A non-transitory computer readable medium having stored thereon, a computer program having at least one code section, the at least one code section being executable by a machine for causing the machine to perform steps comprising:

mapping height values of a synthetic map to pixels of a descriptor;
determining a gradient of the height values for each of the pixels of the descriptor;
applying shading to the descriptor based on shading parameters and the gradient of the height values for each of the pixels of the descriptor to create a shaded descriptor; and
presenting the shaded descriptor at a display system with a 2D ultrasound image having shading corresponding with the shading applied to the shaded descriptor.

17. The non-transitory computer readable medium according to claim 16, comprising one or both of:
retrieving the descriptor from memory based on a selected or default colormap from a plurality of colormaps, wherein the pixels of the descriptor are color pixels corresponding with the selected or default colormap, and
retrieving the shading parameters from memory based on a selected or default shading level of a plurality of shading levels.

18. The non-transitory computer readable medium according to claim 16, wherein the shading parameters correspond with a shading level selected from a plurality of shading levels, the shading parameters comprising one or both of a specular intensity and a diffuse intensity.

19. The non-transitory computer readable medium according to claim 16, wherein determining the gradient of the height values includes determining a separate gradient for each height value of the height values, and wherein the separate gradient for each height value is based on a difference between height values of adjacent pixels of the descriptor.

20. The non-transitory computer readable medium according to claim 19, wherein each separate gradient for each height value is used to compute a surface normal, and wherein applying shading to the descriptor includes applying shading to the descriptor using the shading parameters and the surface normal of each of the pixels of the descriptor.

* * * * *